(No Model.) 2 Sheets—Sheet 1.

H. D. JUSTI.
DENTAL ENGINE.

No. 451,246. Patented Apr. 28, 1891.

WITNESSES:
L. Douville,
Robt. Aiton

INVENTOR
Henry D. Justi.
BY
Joshua Dick Thierry
ATTORNEY.

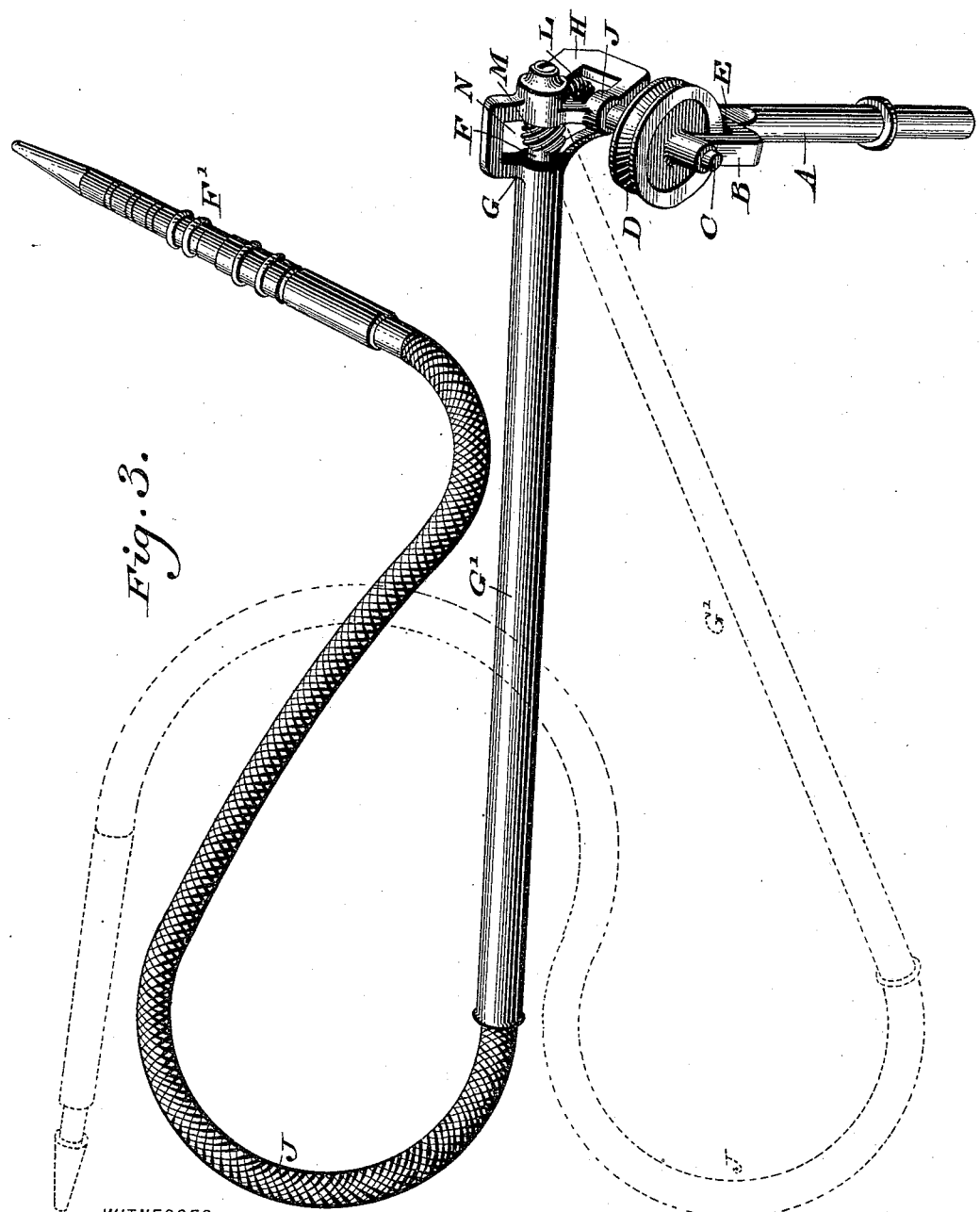

UNITED STATES PATENT OFFICE.

HENRY D. JUSTI, OF PHILADELPHIA, PENNSYLVANIA.

DENTAL ENGINE.

SPECIFICATION forming part of Letters Patent No. 451,246, dated April 28, 1891.

Application filed September 17, 1890. Serial No. 365,292. (No model.)

*To all whom it may concern:*

Be it known that I, HENRY D. JUSTI, a citizen of the United States, residing in the city and county of Philadelphia, State of Pennsylvania, have invented a new and useful Improvement in Dental Engines, which improvement is fully set forth in the following specification and accompanying drawings.

My invention relates to improvements in dental engines; and it consists of gearing mechanism connecting the driving and the tool-holder shafts of the engine, as hereinafter described.

It further consists of the combination of parts hereinafter set forth.

Figure 1:
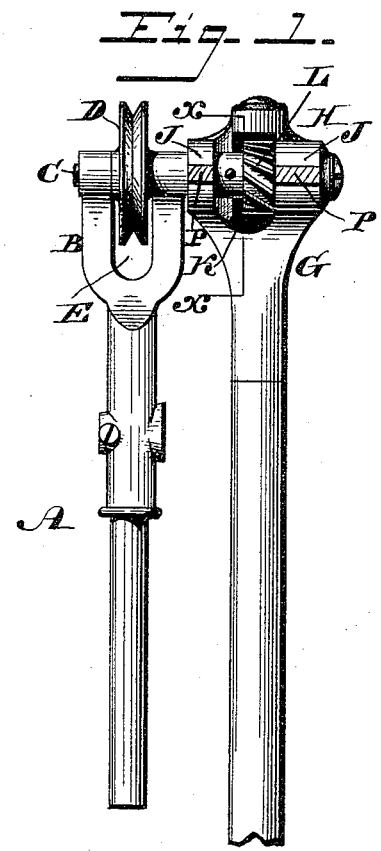
Figure 2:
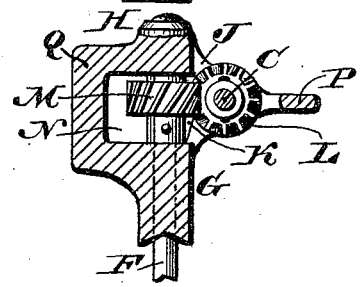

Figure 1 represents a side view, partly broken away, of a portion of a dental engine embodying my invention. Fig. 2 represents a vertical section of the same on line $x\,x$, Fig. 1. Fig. 3 represents a perspective view of a dental engine embodying my invention.

Similar letters of reference indicate corresponding parts in all the figures.

Referring to the drawings, A designates the standard of a dental engine, having a head B, in which the driving-shaft C is journaled. A rotary pulley D is secured to the said shaft, operating within the recess E of the head.

F designates the shaft which carries the tool-holder F', the same having a bearing in a tubular piece or head G, with a tubular arm G'. Rigidly connected with the said piece G is an arm H, provided with two bosses J, in which the shaft C has bearings, and which permits the rotation of the said piece G with its shaft F on the said shaft C.

Secured to the shaft C and located in a recess K between the bosses J is a worm-wheel L, adapted to mesh with a worm-wheel M, which is secured to the shaft F in a recess N, between bearings of the said shaft in the piece G. As thus connected the wheel M is adapted to rotate on the wheel L while being rotated thereby, so that the arm G' may be raised or lowered, as desired, without stopping the rotation of the shaft C, and the gearing operates comparatively noiseless.

Secured to the walls of the recesses K and N are pieces P and Q, which constitute guards for preventing contact of the arm, hand, &c., of the operator with the wheels L and M during the motion of the same.

It will be seen that the shaft F, with its bearings and attachments, may be rotated on or around the shaft C without stopping the rotation or operation of the tool connected therewith.

The other parts of the dental engine shown in Fig. 3 and not described and claimed herein are old and well known and are not further described, being of the usual construction, and forming no part *per se* of this invention. It will be noticed that the piece G, with the bosses J J, which form bearings for the shafts F and C, respectively, are connected as one piece, so that the two shafts are prevented from separating the worm-gearing thereof.

Having thus described my invention, what I claim as new, and desire to secure by Letters Patent, is—

1. A dental engine having a driving-shaft with a worm thereon, a tool-operating shaft with a worm, said worms intermeshing, and a head forming bearings for the tool-operating shaft mounted and rotatable on the driving-shaft, said parts being combined substantially as described.

2. A dental engine having a standard, a head carrying two shafts arranged at an angle to each other, and intermeshing gearing on said shafts, one of said shafts being journaled on said standard and the other being connected with the tool-holder, and the head with the latter shaft being rotatable on the first-named shaft, said parts being combined substantially as described.

HENRY D. JUSTI.

Witnesses:
JOHN A. WIEDERSHEIM,
ROBT. AITON.